US012647969B2

(12) United States Patent
Li

(10) Patent No.: US 12,647,969 B2
(45) Date of Patent: Jun. 2, 2026

(54) TRANSMISSION INFORMATION DETERMINING METHOD AND APPARATUS, AND TERMINAL

(71) Applicant: VIVO MOBILE COMMUNICATION CO., LTD., Chang'an Dongguan (CN)

(72) Inventor: Na Li, Chang'an Dongguan (CN)

(73) Assignee: VIVO MOBILE COMMUNICATION CO., LTD., Dongguang (CN)

( * ) Notice: Subject to any disclaimer, the term of this patent is extended or adjusted under 35 U.S.C. 154(b) by 553 days.

(21) Appl. No.: 18/126,932

(22) Filed: Mar. 27, 2023

(65) Prior Publication Data
US 2023/0232397 A1    Jul. 20, 2023

Related U.S. Application Data

(63) Continuation of application No. PCT/CN2021/120375, filed on Sep. 24, 2021.

(30) Foreign Application Priority Data

Sep. 28, 2020    (CN) .......................... 202011038658.3

(51) Int. Cl.
*H04W 4/00*        (2018.01)
*H04W 72/02*        (2009.01)
*H04W 72/1268*        (2023.01)
*H04W 72/21*        (2023.01)
*H04W 72/566*        (2023.01)
(Continued)

(52) U.S. Cl.
CPC ....... *H04W 72/1268* (2013.01); *H04W 72/02* (2013.01); *H04W 72/21* (2023.01); *H04W 72/569* (2023.01); *H04L 1/18* (2013.01); *H04L 1/1822* (2013.01)

(58) Field of Classification Search
None
See application file for complete search history.

(56) References Cited

U.S. PATENT DOCUMENTS 10,945,280 B2 *    3/2021    Ying ..................... H04L 1/1812
2018/0006790 A1    1/2018    Park et al.
(Continued)

FOREIGN PATENT DOCUMENTS

CN        107210889 A        9/2017
CN        109391421 A        2/2019
(Continued)

OTHER PUBLICATIONS

CATT, "Enhancements for Unlicensed Band URLLC/IIoT," 3GPP TSG RAN WG1 #102-e, Aug. 17-28, 2020, R1-2005703, Mobile Competence Centre, France, 4 pages.
(Continued)

*Primary Examiner* — Bob A Phunkulh
(74) *Attorney, Agent, or Firm* — Foley & Lardner LLP

(57) ABSTRACT

A transmission information determining method and apparatus, and a terminal are provided. The method includes: determining target transmission information of CG transmission according to a target parameter of a configured grant physical uplink shared channel CG PUSCH, where the target transmission information includes at least one of a configuration manner of a retransmission timer, a channel multiplexing manner, a multiplexing encoding manner, or redundant version information.

20 Claims, 4 Drawing Sheets

(51) Int. Cl.
*H04L 1/18* (2023.01)
*H04L 1/1822* (2023.01)

(56) References Cited

U.S. PATENT DOCUMENTS

| | | | | |
|---|---|---|---|---|
| 2018/0198572 A1* | 7/2018 | Wang | .................... | H04L 1/1812 |
| 2019/0215781 A1 | 7/2019 | Jeon et al. | | |
| 2020/0260391 A1 | 8/2020 | Zhou et al. | | |
| 2021/0050933 A1* | 2/2021 | Myung | ................ | H04L 1/0009 |
| 2021/0051671 A1* | 2/2021 | Myung | ................ | H04W 72/21 |
| 2021/0092763 A1* | 3/2021 | Li | ......................... | H04L 1/1671 |
| 2021/0099348 A1* | 4/2021 | Bhattad | ................ | H04L 1/1848 |
| 2021/0100024 A1* | 4/2021 | Bang | .................... | H04L 5/0051 |
| 2021/0266954 A1 | 8/2021 | Xu et al. | | |
| 2022/0053552 A1 | 2/2022 | Li | | |
| 2022/0377766 A1* | 11/2022 | Karaki | .................. | H04L 1/1864 |
| 2022/0393794 A1 | 12/2022 | Wang et al. | | |
| 2023/0269772 A1* | 8/2023 | Chen | ................ | H04W 74/0808 370/329 |
| 2023/0344561 A1* | 10/2023 | Guo | ........................ | H04L 1/189 |
| 2023/0389010 A1* | 11/2023 | Guo | ...................... | H04W 72/56 |

FOREIGN PATENT DOCUMENTS

| | | | |
|---|---|---|---|
| CN | 111181693 A | 5/2020 | |
| CN | 111278129 A | 6/2020 | |
| EP | 2375607 A | 10/2011 | |
| JP | 2023506128 A | 2/2023 | |
| WO | 2020/006687 A1 | 1/2020 | |
| WO | 2020143808 A1 | 7/2020 | |
| WO | 2020/167993 A1 | 8/2020 | |

OTHER PUBLICATIONS

Samsung, "Summary of MAC Open Issues and Corrections," 3GPP TSG-RAN WG2 Meeting #109bis-3, Apr. 20-30, 2020, R2-2003124, Mobile Competence Center, France, 8 pages.

Interdigital, "Configured Grant Transmission in NR-U," 3GPP RAN WG2 Meeting #106, May 13-17, 2019, R2-1906404, Reno, United States of America, 6 pages.

Nokia et al., "On UL enhancements for IIoT/URLLC in unlicensed controlled environment," 3GPP TSG RAN WG1 Meeting #102-e, R1-2006247, pp. 1-4, (Aug. 17-28, 2020).

Nokia et al., "Configured Grant Enhancement Harmonization for NR-U and URLLC," 3GPP TSG-RAN WG2 Meeting #111-e, R2-2006923, pp. 1-4, (Aug. 17-28, 2020).

International Search Report and Written Opinion of the International Searching Authority dated Dec. 13, 2021 as received In Application No. PCT/CN2021/120375.

* cited by examiner

200

S210

Determine target transmission information of CG transmission
according to a target parameter of a CG PUSCH

300

S320

S310

In a case that the target parameter of the CG PUSCH indicates
that one frequency domain resource is configured with a plurality
of the CG PUSCHs, the target transmission information includes
a configuration manner of the retransmission timer

Figures 4, 5, 6:
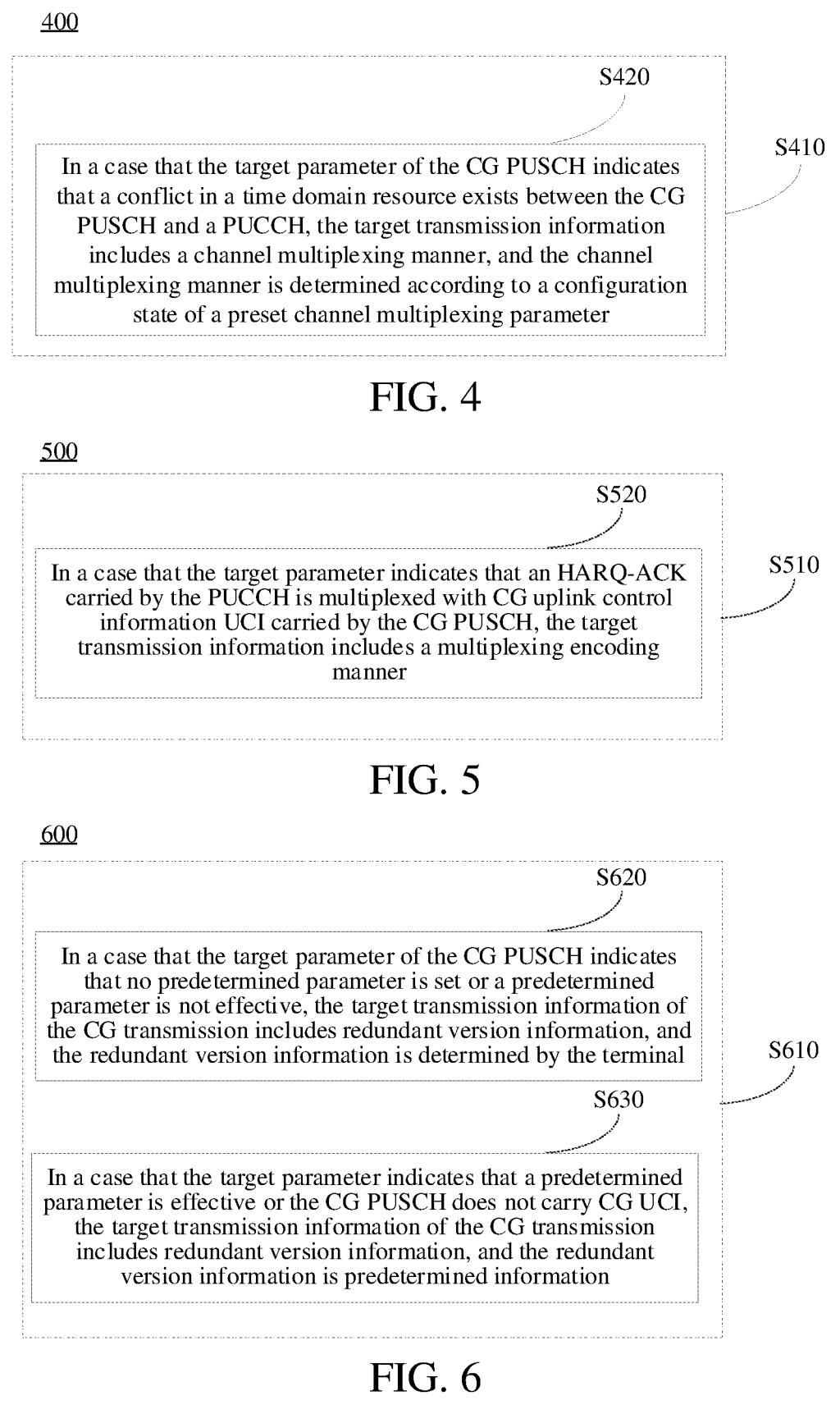

400

S420

In a case that the target parameter of the CG PUSCH indicates that a conflict in a time domain resource exists between the CG PUSCH and a PUCCH, the target transmission information includes a channel multiplexing manner, and the channel multiplexing manner is determined according to a configuration state of a preset channel multiplexing parameter

In a case that the target parameter indicates that an HARQ-ACK carried by the PUCCH is multiplexed with CG uplink control information UCI carried by the CG PUSCH, the target transmission information includes a multiplexing encoding manner

In a case that the target parameter of the CG PUSCH indicates that no predetermined parameter is set or a predetermined parameter is not effective, the target transmission information of the CG transmission includes redundant version information, and the redundant version information is determined by the terminal

S610

S630

In a case that the target parameter indicates that a predetermined parameter is effective or the CG PUSCH does not carry CG UCI, the target transmission information of the CG transmission includes redundant version information, and the redundant version information is predetermined information

TRANSMISSION INFORMATION DETERMINING METHOD AND APPARATUS, AND TERMINAL

CROSS-REFERENCE TO RELATED APPLICATIONS

The present application is continuation application of PCT International Application No. PCT/CN2021/120375 filed on Sep. 24, 2021, which claims priority to Chinese Patent Application No. 202011038658.3, filed with the Chinese Patent Office on Sep. 28, 2020 and entitled "TRANSMISSION INFORMATION DETERMINING METHOD AND APPARATUS, AND TERMINAL", which are incorporated in their entireties by reference herein.

TECHNICAL FIELD

This application relates to the technical field of radio communications, and specifically, to a transmission information determining method and apparatus, and a terminal.

BACKGROUND

In the radio communication related technologies, an uplink configured grant (Configured Grant, CG) mechanism is enhanced from two aspects, namely, ultra-reliable and low latency communications (Ultra-Reliable and Low Latency Communications, URLLC) and an unlicensed band (NR unlicensed band, NR-U), respectively. NR-U-oriented uplink CG enhancement is to avoid a possible negative impact caused by a failure in Listen Before Talk (Listen Before Talk, LBT), and to provide greater flexibility for a terminal (UE) to transmit a CG physical uplink shared channel (Physical Uplink Control Shared Channel, PUSCH). However, URLLC-oriented uplink CG mechanism enhancement is to meet the latency and reliability requirements during service transmission and to support running of different types of service data on the UE.

However, since the foregoing enhancement purposes are different, the functions of the uplink CG in the URLLC and the uplink CG in the NR-U are different, and the functions of the uplink CG in the URLLC and the uplink CG in the NR-U need to be coordinated.

SUMMARY

A first aspect provides a transmission information determining method, performed by a terminal. The method includes: determining target transmission information of CG transmission according to a target parameter of a configured grant physical uplink shared channel CG PUSCH, where the target transmission information includes at least one of a configuration manner of a retransmission timer, a channel multiplexing manner, a multiplexing encoding manner, or redundant version information.

A second aspect provides a transmission information determining apparatus. The apparatus includes: a determining module, configured to determine target transmission information of CG transmission according to a target parameter of a configured grant physical uplink shared channel CG PUSCH, where the target transmission information includes at least one of a configuration manner of a retransmission timer, a channel multiplexing manner, a multiplexing encoding manner, or redundant version information; and a transceiver.

A third aspect provides a terminal. The terminal includes a processor, a memory, and a program or instructions stored on the memory and executable by the processor, where the program or instructions, when executed by the processor, implement the steps of the method according to the first aspect.

A fourth aspect provides a readable storage medium. The readable storage medium stores a program or instruction, where the program or instructions, when executed by the processor, implement the steps of the method according to the first aspect.

A fifth aspect provides a chip. The chip includes a processor and a communication interface, where the communication interface is coupled to the processor, and the processor is configured to run a program or instructions of a network-side device, to implement the method according to the first aspect.

A sixth aspect provides a computer program product. The computer program product includes a processor, a memory, and a program or instructions stored on the memory and executable by the processor, where the program or instructions, when executed by the processor, implement the steps of the method according to the first aspect.

BRIEF DESCRIPTION OF THE DRAWINGS

FIG. 4 is a schematic flowchart of a transmission information determining method according to still another exemplary embodiment of this application;

FIG. 5 is a schematic flowchart of a transmission information determining method according to still another exemplary embodiment of this application;

FIG. 6 is a schematic flowchart of a transmission information determining method according to still another exemplary embodiment of this application;

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first" and "second" are usually one type, and the quantity of objects is not limited. For example, the first object may be one or more than one. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (Long Term Evolution, LTE) system or an LTE-Advanced (LTE-Advanced, LTE-A) system, and can also be used in other wireless communication systems, such as, Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), and Single-carrier Frequency-Division Multiple Access (Single-carrier Frequency-Division Multiple Access, SC-FDMA). The terms "system" and "network" in the embodiments of this application are often used interchangeably, and the described technology can be used not only for the above systems and radio technologies, but also for other systems and radio technologies. However, the following description describes a new radio (New Radio, NR) system for example objectives, and NR terms are used in most of the description below, although these technologies are also applicable to applications other than NR system applications, such as a $6^{th}$ generation ($6^{th}$ Generation, 6G) communication system.

Figures 1, 2, 3:
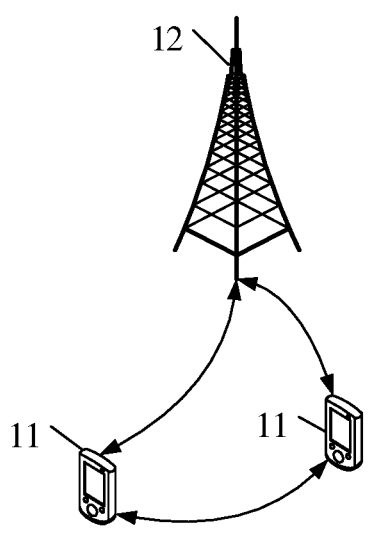
FIG. 1 is a block diagram of a radio communication system according to an exemplary embodiment of this application.
FIG. 2 is a schematic flowchart of a transmission information determining method according to an exemplary embodiment of this application.
FIG. 3 is a schematic flowchart of a transmission information determining method according to another exemplary embodiment of this application.

FIG. 1 is a block diagram of an applicable radio communication system according to an embodiment of this application. The radio communication system includes a terminal 11 and a network-side device 12. The terminal 11 may also be referred to as a terminal device or a user terminal (User Equipment, UE). The terminal 11 may be a terminal-side device such as a mobile phone, a tablet computer (Tablet Personal Computer), a laptop computer (Laptop Computer) or referred to as a notebook computer, a personal digital assistant (Personal Digital Assistant, PDA), a palm computer, a netbook, an ultra-mobile personal computer (ultra-mobile personal computer, UMPC), a mobile Internet device (Mobile Internet Device, MID), a wearable device (Wearable Device) or in-vehicle equipment (VUE), or a pedestrian terminal (PUE). The wearable device includes: a bracelet, a headphone, glasses, or the like. It should be noted that the embodiments of this application are not limited to the specific type of the terminal 11. The network-side device 12 may be a base station or a core network, where the base station may be referred to as a node B, an evolved node B, an access point, a base transceiver station (Base Transceiver Station, BTS), a radio base station, a radio transceiver, a basic service set (Basic Service Set, BSS), an extended service set (Extended Service Set, ESS), a B node, an evolved B node (eNB), a home B node, a home evolved B node, a WLAN access point, a Wi-Fi node, a transmitting receiving point (Transmitting Receiving Point, TRP) or other suitable term in the field, as long as the same technical effect is achieved, the base station is not limited to specific technical vocabularies, and it should be noted that, in the embodiments of this application, a base station in the NR system is used as an example only and the specific type of the base station is not limited.

Technical solutions provided in the embodiments of this application are described below through specific embodiments and application scenarios thereof with reference to the accompanying drawings.

FIG. 2 is a schematic flowchart of a transmission information determining method 200 according to an exemplary embodiment of this application. The method 200 may be applied to but not limited to a terminal, and may be specifically executed by software or/and hardware installed in a terminal. The method includes at least the following steps.

S210: Determine target transmission information of CG transmission according to a target parameter of a CG PUSCH.

The target transmission information includes at least one of a configuration manner of a retransmission timer, a channel multiplexing manner, a multiplexing encoding manner, or redundant version information. Correspondingly, the target parameter of the CG PUSCH may be a parameter used for indicating a number of CG PUSCHs configured on one frequency domain resource, or may be a parameter used for indicating whether a conflict in a time domain resource occurs between the CG PUSCH and a physical uplink control channel (Physical Uplink Control Channel, PUCCH), a parameter used for indicating multiplexing a hybrid automatic repeat request acknowledgement (Hybrid automatic repeat request acknowledgement, HARQ-ACK) carried by the PUCCH and CG uplink control information (Uplink Control Information, UCI) carried by the CG PUSCH, and a parameter used for indicating that no predetermined parameter is set or that a predetermined parameter is not effective, where the predetermined parameter includes Configuredgrantconfig-StartingfromRV0 or the like.

In this embodiment of this application, the terminal determines the target transmission information, such as a configuration manner of a retransmission timer (Retransmission Timer), a channel multiplexing manner, a multiplexing encoding manner, redundant version information, or the like, of the CG transmission according to the target parameter of the CG PUSCH, so that the functions of the uplink CG in the URLLC and the uplink CG in the NR-U (such as the foregoing retransmission timer function, the channel multiplexing function, the multiplexing encoding function, or the like) can be effectively coordinated, and a related mechanism of the uplink CG can support a URLLC service on an unlicensed spectrum, thereby ensuring the communication transmission performance.

FIG. 3 is a schematic flowchart of a transmission information determining method 300 according to an exemplary embodiment of this application. The method 300 may be applied to but not limited to a terminal, and may be specifically executed by software or/and hardware installed in a terminal. The method includes at least the following steps.

S310: Determine target transmission information of CG transmission according to a target parameter of a CG PUSCH.

For a specific implementation of S310, in addition to the foregoing description of S210, in a possible implementation, an implementation process of S310 may include S320 shown in FIG. 3, and the content is in the following.

S320: In a case that the target parameter of the CG PUSCH indicates that one frequency domain resource is configured with a plurality of the CG PUSCHs, the target transmission information includes a configuration manner of the retransmission timer.

The frequency domain resource may include a bandwidth part (Bandwidth Part, BWP) and/or a cell (cell). It may be understood that the retransmission timer may also be recorded as a CG retransmission timer. The configuration manner of the retransmission timer may include at least one of the following (1) to (4).

(1) A retransmission timer of each CG PUSCH is independently configured.

For example, if it is assumed that BWP #1 is configured with two CG PUSCHs, respectively recorded as CG #0 and CG #1, the configuration manner of the retransmission timer may be shown in Table 1 below.

TABLE 1

|  | CG#0 | CG#1 |
| --- | --- | --- |
| Retransmission Configuration of Timer | Configured | Configured |
|  | Configured | Not configured |
|  | Not configured | Configured |
|  | Not configured | Not configured |

(2) Configuration manners of retransmission timers of all CG PUSCHs on a same frequency domain resource are the same.

Similar to the foregoing description, the frequency domain resource may include a BWP or a cell. The configuration manner of the retransmission timer may include that a retransmission timer is configured or a retransmission timer is not configured. In other words, each of the plurality of the CG PUSCHs is configured with a retransmission timer, or none of the plurality of CG PUSCHs is configured with a retransmission timer.

TABLE 2

|  | BWP #1 | | BWP #2 | |
| --- | --- | --- | --- | --- |
|  | CG#0 | CG#1 | CG#2 | CG#3 |
| Retransmission Configuration of Timer | Configured | Configured | Configured | Configured |
|  | Not configured | Not configured | Not configured | Not configured |
|  | Configured | Configured | Not configured | Not configured |
|  | Not configured | Not configured | Configured | Configured |

Example 1: If it is assumed that the frequency domain resource is a BWP, where BWP #1 is configured with CG #0 and CG #1 and BWP #2 is configured with CG #2 and CG #3, the configuration manner of the retransmission timer is shown in Table 2 above.

Example 2: If it is assumed that the frequency domain resource is a cell, where BWP #1 is configured with CG #0 and CG #1 and BWP #2 is configured with CG #2 and CG #3, the configuration manner of the retransmission timer is shown in Table 3 below.

TABLE 3

|  | BWP #1 | | BWP #2 | |
| --- | --- | --- | --- | --- |
|  | CG#0 | CG#1 | CG#2 | CG#3 |
| Retransmission Configuration of Timer | Configured | Configured | Configured | Configured |
|  | Not configured | Not configured | Not configured | Not configured |

(3) Configuration manners of CG retransmission timers of CG PUSCHs configured with a same priority are the same.

The priority may be a physical layer priority (phy-PriorityIndex). In an implementation, that the configuration manners of the retransmission timers of the CG PUSCHs configured with a same priority are the same includes any of the following (31) to (33):

(31) A CG PUSCH configured with a first specified priority is not configured with a retransmission timer.

(32) A CG PUSCH configured with a second specified priority is configured with a retransmission timer.

(33) A CG PUSCH not configured with a specified priority is configured with a retransmission timer.

The first specified priority is different from the second specified priority. For example, the first specified priority may be a high priority and the second specified priority may be a low priority, and vice versa, which is not limited in this embodiment.

TABLE 4

|  | phy-PriorityIndex = p1 | | phy-Priority Index = p0 | |
| --- | --- | --- | --- | --- |
|  | CG#0 | CG#1 | CG#2 | CG#3 |
| Retransmission Configuration of Timer | Configured | Configured | Not configured | Not configured |
|  | Not configured | Not configured | Configured | Configured |
|  | Configured | Configured | Configured | Configured |
|  | Not configured | Not configured | Not configured | Not configured |

For example, if it is assumed that CG #0, CG #1, CG #2, and CG #3 are configured on a BWP, where CG #0 and CG #1 have a same priority p1, and CG #2 and CG #3 have a same priority p0, the configuration manner of the retransmission timer is shown in Table 4 above.

(4) Configuration manners of CG retransmission timers of CG PUSCHs of a same type are the same.

The type refers to a type 1 (Type 1) and a Type 2, namely, a Type 1 CG PUSCH and a Type 2 CG PUSCH.

For example, if it is assumed that what are configured with the Type 1 on a BWP are CG PUSCH #0 and CG PUSCH #1 and what are configured with the Type 2 are CG PUSCH #2 and CG PUSCH #3, in other words, CG #0 and CG #1 are configured with the Type 1 and CG #2 and CG #3 are configured with the Type 2, the configuration manner of the retransmission timer is shown in Table 5 below.

TABLE 5

|  | CG Type 1 | | CG Type 2 | |
| --- | --- | --- | --- | --- |
|  | CG#0 | CG#1 | CG#2 | CG#3 |
| Configuration of Retransmission Timer | Configured | Configured | Not configured | Not configured |
|  | Not configured | Not configured | Configured | Configured |
|  | Configured | Configured | Configured | Configured |
|  | Not configured | Not configured | Not configured | Not configured |

It should be noted that, in the configuration manners of the retransmission timers provided above, in a case that the configuration manners of the retransmission timers are all that a retransmission timer is configured, at least a part of the retransmission timers among the plurality of retransmission timers are different. For example, if it is assumed that CG PUSCH #0, CG PUSCH #1, CG PUSCH #2, CG PUSCH #3, and CG PUSCH #4 are all configured with retransmission timers, timing lengths of five retransmission timers respectively corresponding to CG PUSCH #0, CG PUSCH #1, CG PUSCH #2, CG PUSCH #3, and CG PUSCH #4 may be different one another, or may be partially different, which is not limited in this embodiment.

In this embodiment of this application, for a case where one frequency domain resource is configured with a plurality of CG PUSCHs, a plurality of optional configuration manners of the CG retransmission timers are provided, which effectively coordinate the functions of the retransmission timers of the uplink CG in the URLLC and the uplink CG in the NR-U, so that a configuration mechanism of the retransmission timers of the uplink CG can support a URLLC service on an unlicensed spectrum.

FIG. 4 is a schematic flowchart of a transmission information determining method 400 according to an exemplary embodiment of this application. The method 400 may be applied to but not limited to a terminal, and may be specifically executed by software or/and hardware installed in a terminal. The method includes at least the following steps.

S410: Determine target transmission information of CG transmission according to a target parameter of a CG PUSCH.

For a specific implementation of S410, in addition to the foregoing description of the transmission information determining method 200 and/or the transmission information determining method 300, in a possible implementation, an implementation process of S410 may include S420 shown in FIG. 4, and the content is in the following.

S420: In a case that the target parameter of the CG PUSCH indicates that a conflict in a time domain resource exists between the CG PUSCH and a PUCCH, the target transmission information includes a channel multiplexing manner, and the channel multiplexing manner is determined according to a configuration state of a preset channel multiplexing parameter (cg-UCI-Multiplexing).

The target PUCCH and the CG PUSCH pertain to a same PUCCH group (PUCCH group). The channel multiplexing parameter may include a first channel multiplexing parameter and a second channel multiplexing parameter, where the first channel multiplexing parameter refers to a cg-UCI-Multiplexing parameter in Rel-16, and the first channel multiplexing parameter retains the configuration and meaning of the cg-UCI-Multiplexing parameter in the Rel-16, which may refer to related description in the Rel-16 for details.

The second channel multiplexing parameter refers to the cg-UCI-Multiplexing parameter in the Rel-17, where a configuration or meaning of the cg-UCI-Multiplexing parameter is enhanced or given.

In a first implementation, in a case that the configuration state of the channel multiplexing parameter is that a first channel multiplexing parameter is configured (or enabled, enable) and a priority of the CG PUSCH is a second priority (for example, phy-PriorityIndex=p0), or in a case that the configuration state of the channel multiplexing parameter is that first channel multiplexing parameter is configured and the CG PUSCH is not configured with a priority, the channel multiplexing manner includes at least one of the following:

(1) In a case that a priority of the target PUCCH is a first priority, the target PUCCH is transmitted and the CG PUSCH is discarded.

The CG PUSCH may carry CG UCI, and the target PUCCH may be configured with at least two priorities, for example, a first priority and a second priority, where the first priority is higher than the second priority. In this embodiment, the first priority may be a high priority and the second priority may be a low priority.

Similar to the foregoing target PUCCH, the CG PUSCH and the first control information and the second control information carried by the target PUCCH may be all configured with at least a first priority and a second priority, where the first priority is higher than the second priority. For example, the first priority is a high priority and the second priority is a low priority.

In addition, in this embodiment, the first control information may include an HARQ-ACK and/or channel state information (Channel State Information, CSI) or the like, and the second control information may include a scheduling request (Scheduling Request, SR).

It should be noted that the target PUCCH, the CG PUSCH, the first control information, and the second control information mentioned in subsequent embodiments may refer to the foregoing descriptions, and details are not described in the subsequent portions of this application.

(2) In a case that the target PUCCH carries first control information, the first control information is multiplexed on the CG PUSCH for transmission.

In a case that the first control information is multiplexed on the CG PUSCH, the first control information and the CG UCI carried by the CG PUSCH may be multiplexed.

In an implementation, in a case that the target PUCCH carries first control information in the foregoing (2), the multiplexing the first control information on the CG PUSCH for transmission may include: in a case that the target PUCCH carries the first control information and the priority of the target PUCCH is the second priority, discarding the target PUCCH and multiplexing the first control information on the CG PUSCH for transmission.

(3) In a case that a priority of the target PUCCH is the second priority and the target PUCCH carries second control information, the second control information is discarded and the CG PUSCH is transmitted.

(4) In a case that the target PUCCH carries second control information and a priority of the second control information is the second priority, the second control information is discarded and the CG PUSCH is transmitted.

(5) In a case that the target PUCCH carries second control information and a priority of the second control information is a first priority, the second control information is multiplexed on the CG PUSCH for transmission.

(6) In a case that the target PUCCH carries second control information and a priority of the second control information is a first priority, the second control information is transmitted and the CG PUSCH is discarded.

In a second implementation, in a case that the configuration state is that a first channel multiplexing parameter is configured (enabled, enable) and a priority of the CG PUSCH is a first priority (for example, phy-PriorityIndex=p1), the channel multiplexing manner includes at least one of the following (1) to (3).

(1) In a case that a priority of the target PUCCH is a second priority, the target PUCCH is discarded and the CG PUSCH is transmitted.

(2) In a case that the target PUCCH carries first control information, the first control information is multiplexed on the CG PUSCH for transmission.

In an implementation, in a case that the target PUCCH carries first control information in the foregoing (2), the multiplexing the first control information on the CG PUSCH for transmission may include: in a case that the target PUCCH carries the first control information and the priority of the target PUCCH is the first priority, multiplexing the first control information on the CG PUSCH for transmission.

(3) In a case that the target PUCCH carries second control information, the second control information is discarded and the CG PUSCH is transmitted.

In a possible implementation, in the foregoing (3), in a case that the target PUCCH carries the second control information and the priority of the target PUCCH is the first priority, the second control information is discarded and the CG PUSCH is transmitted.

In the foregoing second implementation, in addition to the foregoing implementation (3), in a case that the target PUCCH carries the first control information (for example, an HARQ-ACK, CSI, or the like), the first control information may be multiplexed on the CG PUSCH for transmission regardless of the priority of the target PUCCH.

In a third implementation, in a case that the configuration state of the channel multiplexing parameter is that a first channel multiplexing parameter is not configured and a priority of the CG PUSCH is a second priority (for example, phy-PriorityIndex=p0), or in a case that the configuration state is that the first channel multiplexing parameter is not configured and the CG PUSCH is not configured with a priority, the channel multiplexing manner includes at least one of the following (1) to (4).

(1) In a case that the target PUCCH carries first control information and the first control information is an HARQ-ACK, the target PUCCH carrying the HARQ-ACK is transmitted and the CG PUSCH is discarded.

(2) In a case that the target PUCCH carries first control information and the first control information is CSI having a first priority, the target PUCCH carrying the CSI is transmitted and the CG PUSCH is discarded.

(3) In a case that the target PUCCH carries first control information and the first control information is CSI having the second priority, the CSI is multiplexed on the CG PUSCH for transmission.

(4) In a case that the target PUCCH carries second control information and the second control information has the second priority, the second control information is discarded and the CG PUSCH is transmitted.

In a fourth implementation, in a case that the configuration state of the channel multiplexing parameter is that a first channel multiplexing parameter is not configured and a priority of the CG PUSCH is a first priority (phy-PriorityIndex=p1), the channel multiplexing manner includes at least one of the following (1) to (4).

(1) In a case that a priority of the target PUCCH is the first priority and the target PUCCH carries first control information, the first control information is multiplexed on the CG PUSCH for transmission.

(2) In a case that a priority of the target PUCCH is the first priority and the target PUCCH carries second control information, the second control information is discarded and the CG PUSCH is transmitted.

(3) In a case that a priority of the target PUCCH is the first priority, the target PUCCH is transmitted and the CG PUSCH is discarded.

(4) In a case that a priority of the target PUCCH is a second priority, the target PUCCH is discarded and the CG PUSCH is transmitted.

In a fifth implementation, in a case that the configuration state of the channel multiplexing parameter is that a second channel multiplexing parameter is configured, the channel multiplexing manner includes at least one of the following (1) to (6).

(1) In a case that a value of the second channel multiplexing parameter is a first specified value (for example, p0) and a priority of the target control information carried by the target PUCCH is a second priority, the target control information is multiplexed on the CG PUSCH for transmission.

The target control information may include first control information and/or second control information, which can be specifically set according to an actual need.

(2) In a case that a value of the second channel multiplexing parameter is a first specified value (for example, p0) and a priority of the target control information carried by the target PUCCH is a first priority, the target PUCCH is transmitted and the CG PUSCH is discarded.

(3) In a case that a value of the second channel multiplexing parameter is a first specified value (for example, p0) and a priority of the target control information carried by the target PUCCH is a first priority, the target control information is multiplexed on the CG PUSCH for transmission.

(4) In a case that a value of the second channel multiplexing parameter is a second specified value (for example, p1) and a priority of the target control information carried by the target PUCCH is a first priority, the target control information is multiplexed on the CG PUSCH for transmission.

(5) In a case that a value of the second channel multiplexing parameter is a second specified value (for example, p1) and a priority of the target control information carried by the target PUCCH is a second priority, the target PUCCH is discarded and the CG PUSCH is transmitted.

(6) In a case that a value of the second channel multiplexing parameter is a third specified value (both), the target control information carried by the target PUCCH is multiplexed on the CG PUSCH for transmission.

In the foregoing fifth implementation, the second channel multiplexing parameter may have at least a first specified value, a second specified value, and a third specified value, for example, p0, p1, and both.

In a possible implementation, a value of the second channel multiplexing parameter may be obtained from an indication of radio resource control (Radio Resource Control, RRC) or/and activation downlink control information (activation Downlink Control Information, DCI).

For example, for a Type 1 CG PUSCH and a Type 2 CG PUSCH, the second channel multiplexing parameter may be a value configured by an RRC, for example, {p0}, {p1}, or {both}.

In another possible implementation, in a case that the type of the CG PUSCH is a specified type and the RRC indicates a plurality of values (for example, p0, p1, both, or the like), the value of the second channel multiplexing parameter is a target value further indicated by the activation DCI, where the target value is one of the plurality of values indicated by the RRC. The specified type may be the Type 2, or the like.

In other words, in a case that the type of the CG PUSCH is the Type 2, if the RRC is configured with a plurality of values, the activation DCI is needed to further indicate which of the plurality of values configured by the RRC is to be used; if the RRC is configured with only one value, an indication by activation DCI is not needed, and the value indicated by the RRC is directly used as the value of the second channel multiplexing parameter; or in a case that the type of the CG PUSCH is a specified type, the value of the second channel multiplexing parameter may not be configured, or whether the second channel multiplexing parameter is {p0, p1, both} is indicated by the activation DCI.

For example, referring to Table 6, if it is assumed that the specified type is, for example, a Type 2 CG PUSCH, the RRC indicates three values, namely, p0, p1, and both, the value of the second channel multiplexing parameter may be a target value indicated by the activation DCI, for example, p1. It should be noted that in a case that the target value p1 should be one of {p0, p1, both} indicated by the RRC but the target value is not one of the plurality of values indicated by the RRC, the terminal may select one value from the plurality of values indicated by the RRC and feed back the selected value to a network-side device or the like.

In a sixth implementation, in a case that the configuration state is that a second channel multiplexing parameter is not configured, the channel multiplexing manner includes at least one of the following (1) to (9).

(1) The target PUCCH is transmitted and the CG PUSCH is discarded.

(2) In a case that a priority of the CG PUSCH is a first priority and a priority of target control information carried by the target PUCCH is the first priority, the target control information is multiplexed on the CG PUSCH for transmission.

The target control information includes first control information and/or second control information.

TABLE 6

| cg-UCI-Multiplexing value configured by RRC | Activation DCI |
| --- | --- |
| {p0} or {p1} or {both} | 0 bit, use RRC configuration directly |
| {p0, p1} or {p0, both} or {p1, both} | 1 bit, for example, b0 |
| | For {p0, p1}, b0 = 0 → p0; b0 = 1 → p1 |
| | For {p0, both}, b0 = 0 → p0; b0 = 1 → both |
| | For {p1, both}, b0 = 0 → p1; b0 = 1 → both |
| {p0, p1, both} | 2 bits, for example, (b1, b0) |
| | (00) → p0; |
| | (01) → p1 |
| | (10) → both |
| | (11) → reserved |

(3) In a case that a priority of the CG PUSCH is a first priority and a priority of target control information carried by the target PUCCH is a second priority, the target PUCCH is discarded and the CG PUSCH is transmitted.

(4) In a case that a priority of the CG PUSCH is a second priority and a priority of target control information carried by the target PUCCH is the second priority, the target control information is multiplexed on the CG PUSCH for transmission.

(5) In a case that a priority of the CG PUSCH is a second priority and a priority of target control information carried by the target PUCCH is a first priority, the target PUCCH is transmitted and the CG PUSCH is discarded.

(6) In a case that a priority of the CG PUSCH is a first priority and a priority of target control information carried by the target PUCCH is the first priority, the target PUCCH is transmitted and the CG PUSCH is discarded.

(7) In a case that a priority of the CG PUSCH is a first priority and a priority of target control information carried by the target PUCCH is a second priority, the target control information is discarded and the CG PUSCH is transmitted.

(8) In a case that a priority of the CG PUSCH is a second priority and a priority of target control information carried by the target PUCCH is a first priority, the target PUCCH is transmitted and the CG PUSCH is discarded.

(9) In a case that a priority of the CG PUSCH is a second priority and a priority of target control information carried by the target PUCCH is the second priority, the target PUCCH is transmitted and the CG PUSCH is discarded.

It may be understood that, in addition to the nine implementations given above, if the configuration of the CG PUSCH on the unlicensed band (unlicensed band) does not need to transmit CG-UCI, the channel multiplexing parameter (for example, the first channel multiplexing parameter or the second channel multiplexing parameter) is not needed. Correspondingly, in a case that the channel multiplexing parameter is not needed, the rules for the UCI carried by the target PUCCH and multiplexing of the CG PUSCH may adopt the rule of URLLC/IIoT in the Rel-16 and/or the Rel-17, which is not described in this embodiment.

In this embodiment of this application, a plurality of channel multiplexing manners are provided according to the configuration state of the channel multiplexing parameter, which can effectively solve the problem that the target parameter of the CG PUSCH indicates that a conflict in a time domain resource exists between the CG PUSCH and the target PUCCH, and further effectively coordinate the channel multiplexing function of the uplink CG in the URLLC and the uplink CG in the NR-U introduced in the Rel-16, so that the channel multiplexing mechanism of the uplink CG can support a URLLC service on an unlicensed spectrum. In addition, this embodiment also effectively protects the transmission performance of the high-priority CG-PUSCH and the high-priority UCI, and improves the communication performance of a radio communication system.

FIG. 5 is a schematic flowchart of a transmission information determining method 500 according to an exemplary embodiment of this application. The method 500 may be applied to but not limited to a terminal, and may be specifically executed by software or/and hardware installed in a terminal. The method includes at least the following steps.

For a specific implementation of S510, in addition to the foregoing description of the transmission information determining method 200 and/or the transmission information determining method 300 and/or the transmission information determining method 400, in a possible implementation, an implementation process of S510 may further include S520 shown in FIG. 5, and the content is in the following.

S520: In a case that the target parameter indicates that an HARQ-ACK carried by the PUCCH is multiplexed with CG uplink control information UCI carried by the CG PUSCH, the target transmission information includes a multiplexing encoding manner.

The multiplexing encoding manner includes independent encoding and joint encoding.

In an implementation, in a case that a priority of the CG PUSCH is a first priority and a priority of the HARQ-ACK is the first priority, or in a case that a priority of the CG PUSCH is a second priority and a priority of the HARQ-ACK is the second priority, the CG UCI and the HARQ-ACK carried by the CG PUSCH are jointly encoded.

In another implementation, in a case that the CG PUSCH has a first priority and the HARQ-ACK has a second priority, or in a case that a priority of the CG PUSCH is a second priority and a priority of the HARQ-ACK is a first priority, the CG UCI and the HARQ-ACK are encoded according to a predetermined encoding rule, where the predetermined encoding rule is the joint encoding or the independent encoding.

The CG PUSCH and the HARQ-ACK are each configured with at least the first priority and the second priority, and the first priority is higher than the second priority. In addition, the predetermined encoding rule may be obtained from an indication by RRC.

In the foregoing two implementations, the first priority may be a high priority, the second priority may be a low priority, and the CG PUSCH carries CG UCI used for indicating related information of the CG PUSCH, where the related information may be a HARQ process ID (process ID), a number (Number), a new data indication (New Data Indication, NDI), and a redundant version (Redundancy version, RV), a shared channel occupancy time (Channel Occupancy Time, COT), or the like.

In this embodiment of this application, in a case that the HARQ-ACK carried by the PUCCH is multiplexed with the CG UCI carried by the CG PUSCH, the HARQ-ACK and the CG PUSCH may be encoded according to different priority information of the HARQ-ACK and the CG PUSCH, for example, joint encoding or independent encoding, thereby effectively coordinating the multiplexing encoding function of the uplink CG in the URLLC and the uplink CG in the NR-U introduced in the Rel-16, so that the channel multiplexing mechanism of the uplink CG can support a URLLC service on an unlicensed spectrum.

FIG. 6 is a schematic flowchart of a transmission information determining method 600 according to an exemplary embodiment of this application. The method 600 may be applied to but not limited to a terminal, and may be specifically executed by software or/and hardware installed in a terminal. The method includes at least the following steps.

For a specific implementation of S610, in addition to the foregoing description of the transmission information determining method 200 in the foregoing S210 and/or the transmission information determining method 300 and/or the transmission information determining method 400 and/or the transmission information determining method 500, in a possible implementation, an implementation process of S610 may further include S620 and S630 shown in FIG. 6, and the content is in the following.

S620: In a case that the target parameter indicates that no predetermined parameter is set or that a predetermined parameter is not effective, the target transmission information of the CG transmission includes redundant version information, and the redundant version information is determined by the terminal.

The predetermined parameter may be expressed as Configuredgrantconfig-StartingfromRV0 or the like.

In a possible implementation, in a case that the redundant version information is determined by the terminal, redundant version indication information is sent to a network-side device, where the redundant version indication information is used for indicating version information of a redundant version determined by the terminal.

For example, if the predetermined parameter Configuredgrantconfig-StartingfromRV0 is set to "off" (that is, the predetermined parameter is not effective), and/or the predetermined parameter is not configured, the redundant version (RV) of the CG PUSCH initially transmitted is determined by a user, and the independently determined redundant version is reported to the network-side device through the CG-UCI.

S630: In a case that the target parameter indicates that a predetermined parameter is effective or the CG PUSCH does not carry CG UCI, the target transmission information of the CG transmission includes redundant version information, and the redundant version information is predetermined information.

For example, if the predetermined parameter Configuredgrantconfig-StartingfromRV0 is set to "on" (that is, the predetermined parameter is effective), and/or the CG PUSCH does not support CG-UCI, the redundant version (RV) of the initial transmission of the CG PUSCH needs to be predetermined information, for example, "0".

It should be noted that whether the predetermined parameter Configuredgrantconfig-StartingfromRV0 is effective (for example, off or on) may be issued by the network-side device and indicated to the terminal.

In this embodiment of this application, the redundant version information used in the CG PUSCH transmission can be determined according to a configuration or an effective condition of a predetermined parameter, thereby effectively coordinating the configuration of a high-level parameter and ensuring the CG transmission performance.

It should be noted that, the execution body of the transmission information determining method provided in the foregoing embodiments of this application may be a transmission information determining apparatus, or a control module, in the transmission information determining apparatus, for performing the transmission information determining method. In a subsequent portion, in this embodiment of this application, the transmission information determining apparatus provided in this embodiment of this application is described by an example in which the transmission information determining apparatus performs the transmission information determining method.

Figure 7A:
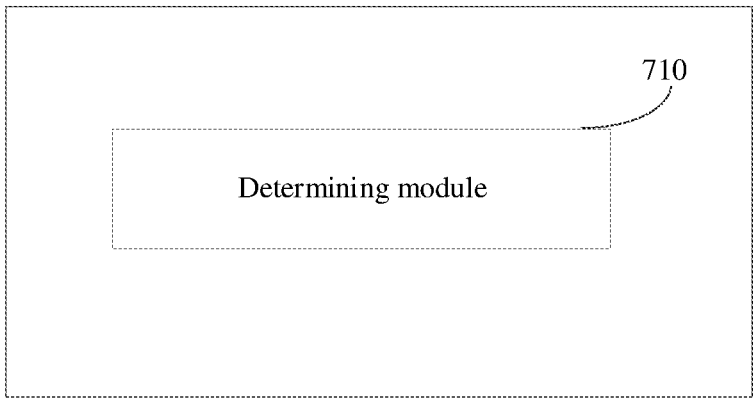
FIG. 7a and FIG. 7b are respectively block diagrams of a transmission information determining apparatus according to an exemplary embodiment of this application.

FIG. 7a is a block diagram of a transmission information determining apparatus 700 according to an exemplary embodiment of this application. The transmission information determining apparatus 700 includes: a determining module 710, configured to determine target transmission information of CG transmission according to a target parameter of a configured grant physical uplink shared channel CG PUSCH, where the target transmission information includes at least one of a configuration manner of a retransmission timer, a channel multiplexing manner, a multiplexing encoding manner, or redundant version information; and a transceiver.

In a possible implementation, in a case that the target parameter of the CG PUSCH indicates that one frequency domain resource is configured with a plurality of the CG PUSCHs, the target transmission information includes the configuration manner of the retransmission timer, where the configuration manner of the retransmission timer includes at least one of the following: a retransmission timer of each CG PUSCH is independently configured; configuration manners of retransmission timers of all CG PUSCHs on a same frequency domain resource are the same; configuration manners of CG retransmission timers of CG PUSCHs configured with a same priority are the same; or configuration manners of CG retransmission timers of CG PUSCHs of a same type are the same, where the frequency domain resource includes a bandwidth part BWP or a cell, and the configuration manners of the retransmission timers include that a retransmission timer is configured or that a retransmission timer is not configured.

In a possible implementation, that configuration manners of CG retransmission timers of CG PUSCHs configured with a same priority are the same includes any of the following: a CG PUSCH configured with a first specified priority is not configured with a retransmission timer; a CG PUSCH configured with a second specified priority is configured with a retransmission timer; or a CG PUSCH not configured with a specified priority is configured with a retransmission timer.

In a possible implementation, in a case that the configuration manners of the retransmission timers are all that a retransmission timer is configured, at least a part of the retransmission timers among the plurality of retransmission timers are different.

In a possible implementation, in a case that the target parameter of the CG PUSCH indicates that a conflict in a time domain resource exists between the CG PUSCH and a target physical uplink control channel PUCCH, the target transmission information includes the channel multiplexing manner and the determining module 710 is configured to determine the channel multiplexing manner according to a preset configuration state of a channel multiplexing parameter, where the target PUCCH and the CG PUSCH pertain to the same PUCCH group.

In a possible implementation, in a case that the configuration state is that a first channel multiplexing parameter is configured and a priority of the CG PUSCH is a second priority, or in a case that the configuration state is that a first channel multiplexing parameter is configured and the CG PUSCH is not configured with a priority, the channel multiplexing manner includes at least one of the following: in a case that a priority of the target PUCCH is a first priority, transmitting the target PUCCH and discarding the CG PUSCH; in a case that the target PUCCH carries first control information, multiplexing the first control information on the CG PUSCH for transmission; in a case that a priority of the target PUCCH is the second priority and the target PUCCH carries second control information, discarding the second control information and transmitting the CG PUSCH; in a case that the target PUCCH carries second control information and a priority of the second control information is the second priority, discarding the second control information and transmitting the CG PUSCH; in a case that the target PUCCH carries second control information and a priority of the second control information is a first priority, multiplexing the second control information on the CG PUSCH for transmission; or in a case that the target PUCCH carries second control information and a priority of the second control information is a first priority, transmitting the second control information and discarding the CG PUSCH, where the CG PUSCH, the target PUCCH, the first control information, and the second control information are each configured with at least the first priority and the second priority, and the first priority is higher than the second priority.

In a possible implementation, in a case that the target PUCCH of the CG PUSCH carries first control information, the multiplexing the first control information on the CG PUSCH for transmission includes: in a case that the target PUCCH carries the first control information and the priority of the target PUCCH is the second priority, discarding the target PUCCH and multiplexing the first control information on the CG PUSCH for transmission.

In a possible implementation, in a case that the configuration state is that a first channel multiplexing parameter is configured and a priority of the CG PUSCH is a first priority, the channel multiplexing manner includes at least one of the following: in a case that a priority of the target PUCCH is a second priority, discarding the target PUCCH and transmitting the CG PUSCH; in a case that the target PUCCH carries first control information, multiplexing the first control information on the CG PUSCH for transmission; or in a case that the target PUCCH carries second control information, discarding the second control information and transmitting the CG PUSCH.

In a possible implementation, in a case that the target PUCCH carries the first control information, the multiplexing the first control information on the CG PUSCH for transmission includes: in a case that the target PUCCH carries the first control information and the priority of the target PUCCH is the first priority, multiplexing the first control information on the CG PUSCH for transmission; and in a case that the target PUCCH carries the second control information, the discarding the second control information and transmitting the CG PUSCH includes: in a case that the target PUCCH carries the second control information and the priority of the target PUCCH is the first priority, discarding the second control information and transmitting the CG PUSCH.

In a possible implementation, in a case that the configuration state is that a first channel multiplexing parameter is not configured and a priority of the CG PUSCH is a second priority, or in a case that the configuration state is that a first channel multiplexing parameter is not configured and the CG PUSCH is not configured with a priority, the channel multiplexing manner includes at least one of the following: in a case that the target PUCCH carries first control information and the first control information is an HARQ-ACK, transmitting the target PUCCH carrying the HARQ-ACK and discarding the CG PUSCH; in a case that the target PUCCH carries first control information and the first control information is CSI having a first priority, transmitting the target PUCCH carrying the CSI and discarding the CG PUSCH; in a case that the target PUCCH carries first control information and the first control information is CSI having the second priority, multiplexing the CSI on the CG PUSCH for transmission; or in a case that the target PUCCH carries second control information and the second control information has the second priority, discarding the second control information and transmitting the CG PUSCH, where the CG PUSCH, the target PUCCH, the first control information, and the second control information are each configured with at least the first priority and the second priority, and the first priority is higher than the second priority.

In a possible implementation, in a case that the configuration state is that a first channel multiplexing parameter is not configured and a priority of the CG PUSCH is a first priority, the channel multiplexing manner includes at least one of the following: in a case that a priority of the target PUCCH is the first priority and the target PUCCH carries first control information, multiplexing the first control information on the CG PUSCH for transmission; in a case that a priority of the target PUCCH is the first priority and the target PUCCH carries second control information, discarding the second control information and transmitting the CG PUSCH; in a case that a priority of the target PUCCH is a first priority, transmitting the target PUCCH and discarding the CG PUSCH; or in a case that a priority of the target PUCCH is a second priority, discarding the target PUCCH and transmitting the CG PUSCH, where the CG PUSCH, the target PUCCH, the first control information, and the second control information are each configured with at least the first priority and the second priority, and the first priority is higher than the second priority.

In a possible implementation, in a case that the configuration state is that a second channel multiplexing parameter is configured, the channel multiplexing manner includes at least one of the following: in a case that a value of the second channel multiplexing parameter is a first specified value and a priority of target control information carried by the target PUCCH is a second priority, multiplexing the target control information on the CG PUSCH for transmission, where the target control information includes first control information and/or second control information; in a case that a value of the second channel multiplexing parameter is a first specified value and a priority of the target control information carried by the target PUCCH is a first priority, transmitting the target PUCCH and discarding the CG PUSCH; in a case that a value of the second channel multiplexing parameter is a first specified value and a priority of the target control information carried by the target PUCCH is a first priority, multiplexing the target control information on the CG PUSCH for transmission; in a case that a value of the second channel multiplexing parameter is a second specified value and a priority of the target control information carried by the target PUCCH is a first priority, multiplexing the target control information on the CG PUSCH for transmission; in a case that a value of the second channel multiplexing parameter is a second specified value and a priority of the target control information carried by the target PUCCH is a second priority, discarding the target PUCCH and transmitting the CG PUSCH; or in a case that a value of the second channel multiplexing parameter is a third specified value, multiplexing the target control information carried by the target PUCCH on the CG PUSCH for transmission, where the CG PUSCH, the target PUCCH, the first control information, and the second control information are each configured with at least the first priority and the second priority, and the first priority is higher than the second priority.

In a possible implementation, the value of the second channel multiplexing parameter is obtained from an indication by radio resource control RRC or/and activation downlink control information DCI.

In a possible implementation, in a case that the type of the CG PUSCH is a specified type and the RRC indicates a plurality of values, the value of the second channel multiplexing parameter is a target value indicated by the activation DCI, where the target value is one of the plurality of values indicated by the RRC.

In a possible implementation, in a case that the configuration state is that a second channel multiplexing parameter is not configured, the channel multiplexing manner includes at least one of the following: transmitting the target PUCCH and discarding the CG PUSCH; in a case that a priority of the CG PUSCH is a first priority and a priority of target control information carried by the target PUCCH is the first priority, multiplexing the target control information on the CG PUSCH for transmission, where the target control information includes first control information and/or second control information; in a case that a priority of the CG PUSCH is a first priority and a priority of target control information carried by the target PUCCH is a second priority, discarding the target PUCCH and transmitting the CG PUSCH; in a case that a priority of the CG PUSCH is a second priority and a priority of target control information carried by the target PUCCH is the second priority, multiplexing the target control information on the CG PUSCH for transmission; in a case that a priority of the CG PUSCH is a second priority and a priority of target control information carried by the target PUCCH is a first priority, transmitting the target PUCCH and discarding the CG PUSCH; in a case that a priority of the CG PUSCH is a first priority and a priority of target control information carried by the target PUCCH is the first priority, transmitting the target PUCCH and discarding the CG PUSCH; in a case that a priority of the CG PUSCH is a first priority and a priority of target control information carried by the target PUCCH is a second priority, discarding the target control information and transmitting the CG PUSCH; in a case that a priority of the CG PUSCH is a second priority and a priority of target control information carried by the target PUCCH is a first priority, transmitting the target PUCCH and discarding the CG PUSCH; or in a case that a priority of the CG PUSCH is a second priority and a priority of target control information carried by the target PUCCH is the second priority, transmitting the target PUCCH and discarding the CG PUSCH, where the CG PUSCH, the target PUCCH, the first control information, and the second control information are each configured with at least the first priority and the second priority, and the first priority is higher than the second priority.

In a possible implementation, the first control information includes a hybrid automatic repeat request acknowledgement HARQ-ACK and/or channel state information CSI, and the second control information includes a scheduling request SR.

In a possible implementation, in a case that the target parameter of the CG PUSCH indicates that an HARQ-ACK carried by the PUCCH is multiplexed with CG uplink control information UCI carried by the CG PUSCH, the target transmission information includes a multiplexing encoding manner, and the multiplexing encoding manner includes independent encoding and joint encoding.

In a possible implementation, in a case that a priority of the CG PUSCH is a first priority and a priority of the HARQ-ACK is the first priority, or in a case that a priority of the CG PUSCH is a second priority and a priority of the HARQ-ACK is the second priority, the CG UCI and the HARQ-ACK carried by the CG PUSCH are jointly encoded; or in a case that the CG PUSCH has a first priority and the HARQ-ACK has a second priority, or in a case that a priority of the CG PUSCH is a second priority and a priority of the HARQ-ACK is a first priority, the CG UCI and the HARQ-ACK are encoded according to a predetermined encoding rule, where the predetermined encoding rule is the joint encoding or the independent encoding. The CG PUSCH and the HARQ-ACK are each configured with at least the first priority and the second priority, and the first priority is higher than the second priority.

In a possible implementation, the predetermined encoding rule is obtained from an indication by RRC.

In a possible implementation, in a case that the target parameter of the CG PUSCH indicates that no predetermined parameter is set or that a predetermined parameter is not effective, the target transmission information of the CG transmission includes redundant version information, and the redundant version information is determined by the terminal; or in a case that the target parameter of the CG PUSCH indicates that a predetermined parameter is effective or the CG PUSCH does not carry CG UCI, the target transmission information of the CG transmission includes redundant version information, and the redundant version information is predetermined information.

Figure 7B:
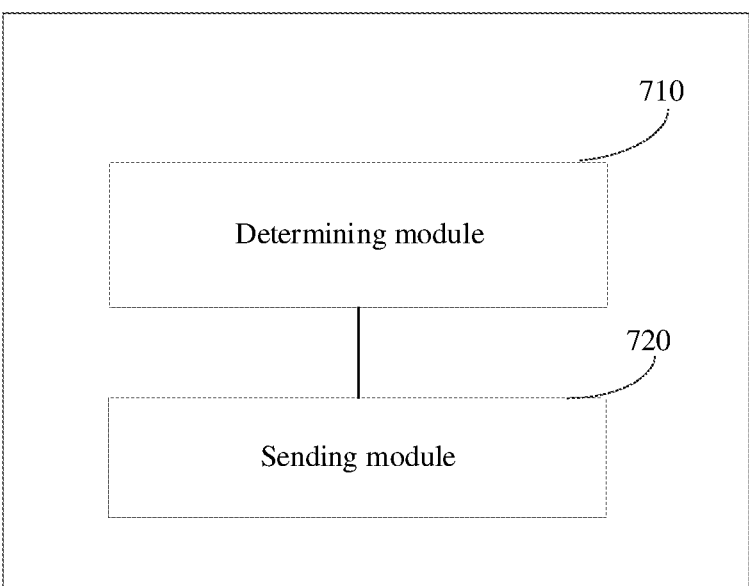

In a possible implementation, as shown in FIG. 7b, the apparatus 700 further includes: a sending module 720, configured to: in a case that the redundant version information is determined by the terminal, send redundant version indication information to a network-side device, where the redundant version indication information is used for indicating version information of a redundant version determined by the terminal.

In the embodiments of this application, target transmission information of CG transmission is determined according to a target parameter of a configured grant physical uplink shared channel CG PUSCH, where the target transmission information includes at least one of a configuration manner of a retransmission timer, a channel multiplexing manner, a multiplexing encoding manner, or redundant version information. Therefore, functions of an uplink CG in a URLLC and an uplink CG in an NR-U can be effectively coordinated, so that a related mechanism of the uplink CG can support a URLLC service on an unlicensed spectrum.

The transmission information determining apparatus 700 in this embodiment of this application may be an apparatus, or may be a component, an integrated circuit, or a chip in a terminal. The apparatus 700 may be a mobile terminal or a non-mobile terminal. For example, the mobile terminal may include, but is not limited to, the types of the terminal 11 listed above, and the non-mobile terminal may be a server, a network attached storage (Network Attached Storage, NAS), a personal computer (personal computer, PC), a television (television, TV), an automatic teller machine, a self-service machine, or the like, which are not specifically limited in this embodiment of this application.

The transmission information determining apparatus 700 in this embodiment of this application may be an apparatus having an operating system. The operating system may be an Android (Android) operating system, may be an ios operating system, or may be another possible operating system, which is not specifically limited in this embodiment of this application.

The transmission information determining apparatus 700 provided in this embodiment of this application can implement the processes implemented in the method embodiments of FIG. 2 to FIG. 6, and in addition the same technical effect can be achieved, which are not repeated herein in order to avoid duplication.

Figure 8:
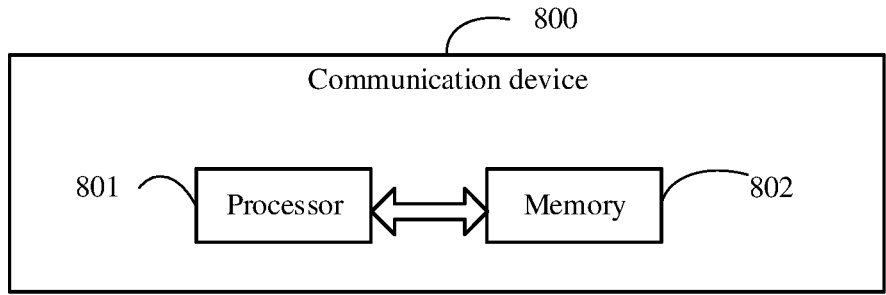
FIG. 8 is a block diagram of a communication device according to an exemplary embodiment of this application.

Optionally, as shown in FIG. 8, an embodiment of this application further provides a communication device 800, including a processor 801, a memory 802, a program or instructions stored on the memory 802 and capable of being run on the processor 801. For example, in a case that the communication device 800 is a terminal, the program or the instructions, in a case that executed by the processor 801, implement the processes of the foregoing embodiment of the transmission information determining method, and in addition the same technical effect can be achieved. In a case that the communication device 800 is a network-side device, the program or the instructions, in a case that executed by the processor 801, implement the processes of the foregoing embodiment of the transmission information determining method, and in addition the same technical effect can be achieved, which are not repeated herein in order to avoid duplication.

Figure 9:
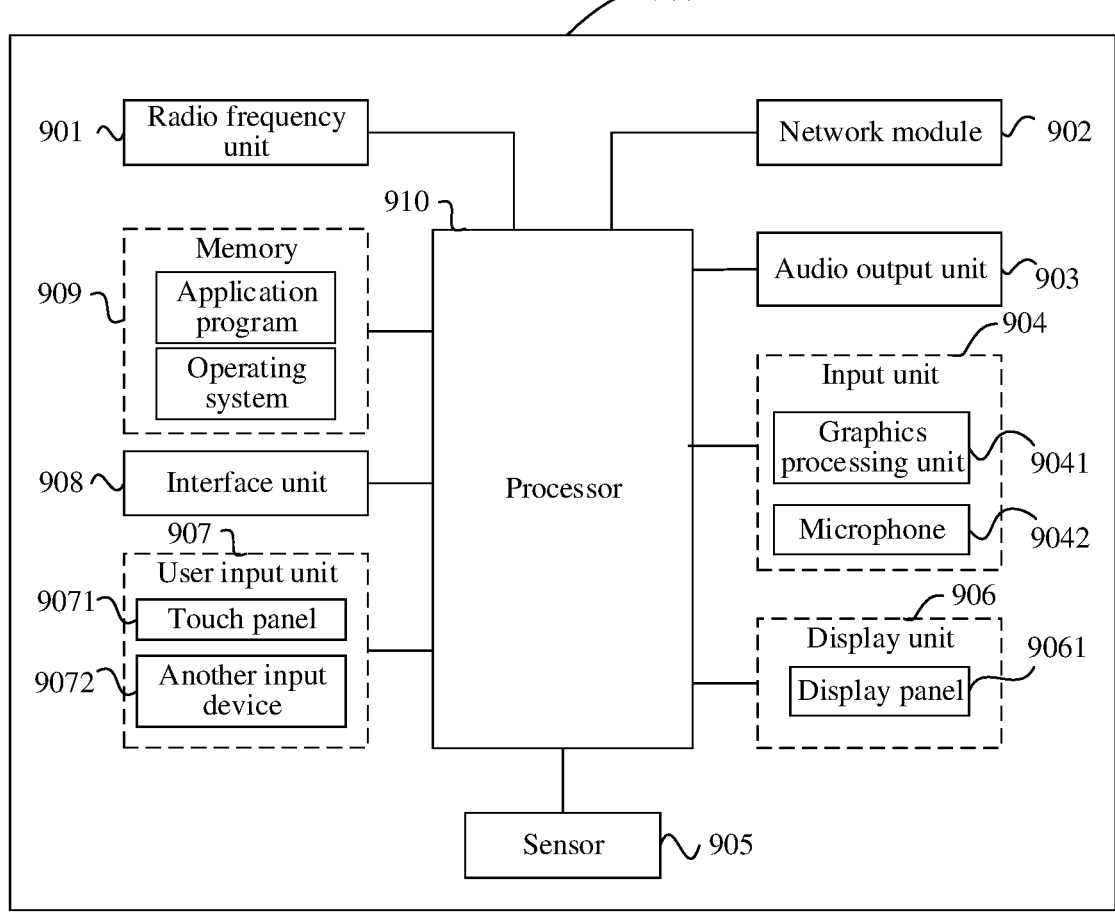
FIG. 9 is a block diagram of a terminal according to an exemplary embodiment of this application.

Optionally, FIG. 9 is a schematic structural diagram of a hardware structure of a terminal 900 for implementing an embodiment of this application. The terminal 900 includes, but is not limited to, components such as a radio frequency unit 901, a network module 902, an audio output unit 903, an input unit 904, a sensor 905, a display unit 906, a user input unit 907, an interface unit 908, a memory 909, and a processor 910.

It may be understood by those skilled in the art that the terminal 900 may further include a power supply (for example, a battery) for supplying power to various components, and the power supply may be logically connected to the processor 910 through a power management system, so as to implement functions such as managing charging or discharging, and power consumption management through the power management system. The terminal structure shown in FIG. 9 does not constitute a limitation to the terminal, and the terminal may include more or fewer components than illustrated, or a combination of specific components, or arrangement of different components, which are not described herein again.

It should be understood that, in this embodiment of this application, the input unit 904 may include a graphics processing unit (Graphics a Processing Unit, GPU) 1041 and a microphone 9042. The graphics processing unit 9041 processes image data of a still picture or a video obtained by an image capture apparatus (such as a camera) in a video capture mode or an image capture mode. The display unit 906 may include a display panel 9061. The display panel 9061 may be configured in a form of a liquid crystal display, an organic light emitting diode, or the like. The user input unit 907 includes a touch panel 9071 and another input device 9072. The touch panel 9071 is also referred to as a touchscreen. The touch panel 9071 may include a touch detection apparatus and a touch controller. The another input device 9072 may include, but is not limited to, a physical keyboard, a function key (such as a volume control key, a switch key, or the like), a trackball, a mouse, and an operating lever, which is not described in detail herein.

In this embodiment of this application, the radio frequency unit 901 receives downlink data from a network-side device to then send the downlink data to the processor 910 for processing; and in addition, sends uplink data to the network-side device. Generally, the radio frequency unit 901 includes, but is not limited to, an antenna, at least one amplifier, a transceiver, a coupler, a low noise amplifier, a duplexer, or the like.

The memory 909 may be configured to store a software program or instructions, and various data. The memory 909 may mainly include a storage program or instruction area and a storage data area, where the storage program or instruction area may store an operating system, an application program or instructions required for at least one function (for example, a sound playing function, an image playing function, or the like). In addition, the memory 909 may include a high-speed random access memory, and may also include a non-volatile memory, where the non-volatile memory may be a Read-Only Memory (Read-Only Memory, ROM), a programmable ROM (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash storage device, or other non-volatile solid-state storage device.

The processor 910 may include one or more processing units. Optionally, the processor 910 may be integrated with an application processor and a modulation and demodulation processor, where the application processor mainly processes an operating system, a user interface, an application program, or instructions, and the like, and the modulation and demodulation processor mainly processes radio communications, for example, a baseband processor. It may be understood that the foregoing modulation and demodulation processor may also not be integrated into the processor 910.

The processor 910 is configured to determine target transmission information of CG transmission according to a target parameter of a configured grant physical uplink shared channel CG PUSCH, where the target transmission information includes at least one of a configuration manner of a retransmission timer, a channel multiplexing manner, a multiplexing encoding manner, or redundant version information.

In the embodiments of this application, target transmission information of CG transmission is determined according to a target parameter of a configured grant physical uplink shared channel CG PUSCH, where the target transmission information includes at least one of a configuration manner of a retransmission timer, a channel multiplexing manner, a multiplexing encoding manner, or redundant version information. Therefore, functions of an uplink CG in a URLLC and an uplink CG in an NR-U can be effectively coordinated, so that a related mechanism of the uplink CG can support a URLLC service on an unlicensed spectrum.

An embodiment of this application further provides a readable storage medium. The readable storage medium stores a program or instructions, where the program or instructions, when executed by a processor, implement all processes of the embodiments of the above transmission information determining method, and can achieve the same technical effects. To avoid repetition, details are not described herein again.

The processor is the processor in the terminal in the above embodiments. The readable storage medium includes a computer-readable storage medium, for example, a computer read-only memory (Read-Only Memory, ROM), a random access memory (Random Access Memory, RAM), a magnetic disk, or an optical disc.

An embodiment of this application further provides a chip. The chip includes: a processor and a communication interface, where the communication interface is coupled to the processor, and the processor is configured to run a program or instructions of a network-side device, to implement all processes of the embodiments of the above transmission information determining method, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program product. The computer program product includes a processor, a memory, and a program or instructions stored on the memory and executable on the processor, where the program or instructions, when executed by the processor, implement all processes of the embodiments of the above transmission information determining method, and can achieve the same technical effects. To avoid repetition, details are not described herein again.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A transmission information determining method, performed by a terminal, wherein the method comprises:

determining target transmission information of CG transmission according to a target parameter of a configured grant physical uplink shared channel (CG PUSCH), wherein the determining target transmission information of CG transmission according to a target parameter of a configured grant physical uplink shared channel (CG PUSCH) comprises:

in a case that the target parameter of the CG PUSCH indicates that one frequency domain resource is configured with a plurality of the CG PUSCHs, the target transmission information comprises a configuration manner of a retransmission timer, wherein the configuration manner of the retransmission timer comprises:

configuration manners of retransmission timers of CG PUSCHs configured with a same priority are the same, wherein the frequency domain resource comprises a bandwidth part (BWP), and the configuration manners of the retransmission timers comprise that a retransmission timer is configured or that a retransmission timer is not configured.

2. The method according to claim 1, wherein the configuration manner of the retransmission timer further comprises at least one of the following:

a retransmission timer of each CG PUSCH is independently configured;

configuration manners of retransmission timers of all CG PUSCHs on a same frequency domain resource are the same; or configuration manners of CG retransmission timers of CG PUSCHs of a same type are the same, wherein the frequency domain resource comprises the BWP or a cell.

3. The method according to claim 2, wherein that configuration manners of retransmission timers of CG PUSCHs configured with a same priority are the same comprises any of the following:

a CG PUSCH configured with a first specified priority is not configured with a retransmission timer;

a CG PUSCH configured with a second specified priority is configured with a retransmission timer; or a CG PUSCH not configured with a specified priority is configured with a retransmission timer.

4. The method according to claim 1, wherein the determining target transmission information of CG transmission according to a target parameter of a configured grant physical uplink shared channel (CG PUSCH) comprises:

in a case that the target parameter of the CG PUSCH indicates that a conflict in a time domain resource exists between the CG PUSCH and a target physical uplink control channel (PUCCH), the target transmission information comprises the channel multiplexing manner, and the channel multiplexing manner is determined according to a configuration state of a preset channel multiplexing parameter, wherein the target PUCCH and the CG PUSCH pertain to a same PUCCH group.

5. The method according to claim 4, wherein in a case that the configuration state is that a first channel multiplexing parameter is configured and a priority of the CG PUSCH is a second priority, or in a case that the configuration state is that a first channel multiplexing parameter is configured and the CG PUSCH is not configured with a priority, the channel multiplexing manner comprises:

in a case that the target PUCCH carries first control information, multiplexing the first control information on the CG PUSCH for transmission;

wherein the CG PUSCH, and the first control information are each configured with at least the first priority and the second priority, and the first priority is higher than the second priority.

6. The method according to claim 5, wherein in a case that the target PUCCH carries first control information, the multiplexing the first control information on the CG PUSCH for transmission comprises:

in a case that the target PUCCH carries the first control information and the priority of the target PUCCH is the second priority, discarding the target PUCCH and multiplexing the first control information on the CG PUSCH for transmission.

7. The method according to claim 5, wherein the first control information comprises a hybrid automatic repeat request acknowledgement (HARQ-ACK).

8. The method according to claim 4, wherein in a case that the configuration state is that a first channel multiplexing parameter is configured and a priority of the CG PUSCH is a first priority, the channel multiplexing manner comprises:

in a case that the target PUCCH carries first control information, multiplexing the first control information on the CG PUSCH for transmission.

9. The method according to claim 8, wherein in a case that the target PUCCH carries the first control information, the multiplexing the first control information on the CG PUSCH for transmission comprises:

in a case that the target PUCCH carries the first control information and the priority of the target PUCCH is the first priority, multiplexing the first control information on the CG PUSCH for transmission.

10. The method according to claim 4, wherein in a case that the configuration state is that a first channel multiplexing parameter is not configured and a priority of the CG PUSCH is a second priority, or in a case that the configuration state is that a first channel multiplexing parameter is not configured and the CG PUSCH is not configured with a priority, the channel multiplexing manner comprises:

in a case that the target PUCCH carries first control information and the first control information is an HARQ-ACK, transmitting the target PUCCH carrying the HARQ-ACK and discarding the CG PUSCH;

wherein the CG PUSCH, and the first control information, are each configured with at least the first priority and the second priority, and the first priority is higher than the second priority.

11. The method according to claim 4, wherein in a case that the configuration state is that a first channel multiplexing parameter is not configured and a priority of the CG PUSCH is a first priority, the channel multiplexing manner comprises at least one of the following:

in a case that a priority of the target PUCCH is a first priority, transmitting the target PUCCH and discarding the CG PUSCH; or in a case that a priority of the target PUCCH is a second priority, discarding the target PUCCH and transmitting the CG PUSCH, wherein the CG PUSCH, and the target PUCCH are each configured with at least the first priority and the second priority, and the first priority is higher than the second priority.

12. The method according to claim 1, wherein the determining target transmission information of CG transmission according to a target parameter of a configured grant physical uplink shared channel CG PUSCH comprises:

in a case that the target parameter of the CG PUSCH indicates that an HARQ-ACK carried by the CG PUCCH is multiplexed with CG uplink control information (UCI) carried by the CG PUSCH, the target transmission information comprises a multiplexing encoding manner, and the multiplexing encoding manner comprises independent encoding and joint encoding.

13. The method according to claim 12, comprising: in a case that a priority of the CG PUSCH is a first priority and a priority of the HARQ-ACK is the first priority, or in a case that a priority of the CG PUSCH is a second priority and a priority of the HARQ-ACK is the second priority, joint encoding the CG UCI and the HARQ-ACK carried by the CG PUSCH; or in a case that a priority of the CG PUSCH is a first priority and a priority of the HARQ-ACK is a second priority, or in a case that a priority of the CG PUSCH is a second priority and a priority of the HARQ-ACK is a first priority, encoding the CG UCI and the HARQ-ACK according to a predetermined encoding rule, wherein the predetermined encoding rule is the independent encoding.

14. A terminal, comprising a processor, a memory, and a program or instructions stored in the memory and executable by the processor, wherein the program or instructions, when executed by the processor, implement the following steps:

determining target transmission information of CG transmission according to a target parameter of a configured grant physical uplink shared channel (CG PUSCH),

wherein the determining target transmission information of CG transmission according to a target parameter of a configured grant physical uplink shared channel (CG PUSCH) comprises:

in a case that the target parameter of the CG PUSCH indicates that one frequency domain resource is configured with a plurality of the CG PUSCHs, the target transmission information comprises a configuration manner of a retransmission timer, wherein the configuration manner of the retransmission timer comprises:

configuration manners of retransmission timers of all CG PUSCHs on a same frequency domain resource are the same, wherein the frequency domain resource comprises a bandwidth part (BWP), and the configuration manners of the retransmission timers comprise that a retransmission timer is configured or that a retransmission timer is not configured.

15. The terminal according to claim 14, wherein the configuration manner of the retransmission timer further comprises at least one of the following:

a retransmission timer of each CG PUSCH is independently configured;

configuration manners of retransmission timers of all CG PUSCHs on a same frequency domain resource are the same; or the frequency domain resource comprises the BWP or a cell.

16. The terminal according to claim 15, wherein that configuration manners of retransmission timers of CG PUSCHs configured with a same priority are the same comprises any of the following:

a CG PUSCH configured with a first specified priority is not configured with a retransmission timer;

a CG PUSCH configured with a second specified priority is configured with a retransmission timer; or a CG PUSCH not configured with a specified priority is configured with a retransmission timer.

17. The terminal according to claim 14, wherein the determining target transmission information of CG transmission according to a target parameter of a configured grant physical uplink shared channel (CG PUSCH) comprises:

in a case that the target parameter of the CG PUSCH indicates that a conflict in a time domain resource exists between the CG PUSCH and a target physical uplink control channel PUCCH, the target transmission information comprises a channel multiplexing manner, and the channel multiplexing manner is determined according to a configuration state of a preset channel multiplexing parameter, wherein

26 the target PUCCH and the CG PUSCH pertain to a same PUCCH group.

18. The terminal according to claim 17, wherein in a case that the configuration state is that a first channel multiplexing parameter is configured and a priority of the CG PUSCH is a second priority, or in a case that the configuration state is that a first channel multiplexing parameter is configured and the CG PUSCH is not configured with a priority, the channel multiplexing manner comprises:

in a case that the target PUCCH carries first control information, multiplexing the first control information on the CG PUSCH for transmission;

wherein the CG PUSCH, and the first control information are each configured with at least the first priority and the second priority, and the first priority is higher than the second priority.

19. The terminal according to claim 17, wherein in a case that the configuration state is that a first channel multiplexing parameter is configured and a priority of the CG PUSCH is a first priority, the channel multiplexing manner comprises:

in a case that the target PUCCH carries first control information, multiplexing the first control information on the CG PUSCH for transmission.

20. A non-transitory readable storage medium, wherein the non-transitory readable storage medium stores a program or instructions, wherein the program or instructions, when executed by a processor, implement the following step:

determining target transmission information of CG transmission according to a target parameter of a configured grant physical uplink shared channel (CG PUSCH), wherein the determining target transmission information of CG transmission according to a target parameter of a configured grant physical uplink shared channel (CG PUSCH) comprises:

in a case that the target parameter of the CG PUSCH indicates that one frequency domain resource is configured with a plurality of the CG PUSCHs, the target transmission information comprises a configuration manner of a retransmission timer, wherein the configuration manner of the retransmission timer comprises:

configuration manners of retransmission timers of CG PUSCHs configured with a same priority are the same, wherein the frequency domain resource comprises a bandwidth part (BWP), and the configuration manners of the retransmission timers comprise that a retransmission timer is configured or that a retransmission timer is not configured.

* * * * *